(12) United States Patent
Wier

(10) Patent No.: US 6,206,423 B1
(45) Date of Patent: *Mar. 27, 2001

(54) VEHICLE WITH A SEAT BELT TENSIONER SECURED TO THE FLOOR OF THE VEHICLE

(75) Inventor: Franz Wier, Göggingen (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/171,585

(22) PCT Filed: Apr. 23, 1997

(86) PCT No.: PCT/EP97/02068

§ 371 Date: Oct. 21, 1998

§ 102(e) Date: Oct. 21, 1998

(87) PCT Pub. No.: WO97/39921

PCT Pub. Date: Oct. 30, 1997

(30) Foreign Application Priority Data

Apr. 23, 1996 (DE) .............................. 296 07 362

(51) Int. Cl.⁷ ...................................... B60R 22/22
(52) U.S. Cl. ................. 280/801.1; 280/805; 411/349
(58) Field of Search ................... 280/801.1, 805; 297/482, 480; 60/632; 242/374; 411/553, 549, 349

(56) References Cited

U.S. PATENT DOCUMENTS

| | | | |
|---|---|---|---|
| 2,239,125 | * 4/1941 | Summers | 411/553 |
| 2,282,360 | * 5/1942 | Horrocks | 411/553 |
| 2,423,432 | * 7/1947 | Barlow | 411/553 |
| 3,440,602 | * 4/1969 | Frig | 340/457.1 |
| 3,583,530 | * 6/1971 | De Venne | 188/268 |
| 3,649,786 | * 3/1972 | Mauron | 200/61.53 |
| 3,838,746 | * 10/1974 | Andres | 180/82 |
| 3,888,085 | * 6/1975 | Larsonneur | 60/635 |
| 3,917,031 | 11/1975 | Doin et al. . | |
| 4,422,669 | * 12/1983 | Chiba et al. | 280/806 |
| 4,458,921 | * 7/1984 | Chilba et al. | 280/806 |
| 5,096,224 | * 3/1992 | Murakami et al. | 280/808 |
| 5,169,173 | * 12/1992 | Nishizawa | 280/806 |
| 5,350,194 | * 9/1994 | Fohl | 280/805 |
| 5,366,245 | 11/1994 | Lane, Jr. . | |
| 5,368,427 | * 11/1994 | Pfaffinger | 411/553 |
| 5,403,070 | * 4/1995 | Jahn et al. | 297/468 |
| 5,553,890 | * 9/1996 | Buhr et al. | 280/806 |
| 5,568,940 | * 10/1996 | Lane, Jr. | 280/806 |
| 5,927,756 | * 7/1999 | Wier | 280/206 |

FOREIGN PATENT DOCUMENTS

| | | |
|---|---|---|
| 2104446 | 4/1972 | (FR) . |
| 1351447 | 5/1974 | (GB) . |
| B1351447 | 5/1974 | (GB) . |
| 1571505 | 7/1980 | (GB) . |

* cited by examiner

Primary Examiner—J. J. Swann
Assistant Examiner—J. Allen Shriver
(74) Attorney, Agent, or Firm—Tarolli, Sundheim, Covell, Tummino & Szabo L.L.P.

(57) ABSTRACT

A vehicle, with a vehicle floor (1), with a belt tensioner (2) which includes a piston/cylinder unit, and with a device for fastening the cylinder (3) to the vehicle floor is characterized in that the vehicle floor (1) has a recess into which the cylinder (3) at least partially projects.

25 Claims, 4 Drawing Sheets

VEHICLE WITH A SEAT BELT TENSIONER SECURED TO THE FLOOR OF THE VEHICLE

The invention relates to a vehicle, with a vehicle floor, with a belt tensioner which comprises a piston/cylinder unit, and with a device for fastening the cylinder to the vehicle floor.

Hitherto, belt tensioners have been fastened to the vehicle for example by the provision of a flange which is welded to the cylinder, this flange being arrested in a fork-shaped part which is screwed to the vehicle floor. Irrespective of whether the flange is arranged laterally or on the end face of the cylinder facing away from the belt engaging means, this type of fastening increases the space required for the installation of the cylinder in the vehicle. Owing to the considerable axial length of a belt tensioner, it has been necessary hitherto to install this in the vehicle with a cable deflector, because otherwise the belt engaging means, in normal cases the belt buckle, projects too far upwards, in some cases to above the seat surface. In fact the use of a cable deflector, however, additionally increases the necessary installation space which makes fitting the belt tensioner the vehicle still more difficult.

The invention provides a vehicle in which fitting of the belt tensioner in the vehicle is distinctly facilitated and the space occupied by the belt tensioner in the interior of the vehicle remains small. This is achieved in a vehicle of the type initially mentioned in that the vehicle floor has a recess into which the cylinder at least partially projects. The belt tensioner therefore need not be arranged completely inside the vehicle, but rather projects into the recess which is provided for it, so that the installation space which is available for the belt tensioner in its axial direction is increased. Expensive measures provided hitherto for shortening the belt tensioner whilst maintaining as long a tensioning path as possible can be dispensed with, which makes the belt tensioner as a whole more favourable. Fitting the belt tensioner in the vehicle in this manner also allows to install the belt tensioner in the vehicle without a cable deflector.

According to a preferred embodiment, the recess is configured and the positions of the fastening device and of the cylinder are coordinated with each other such that the central axis of the traction transfer means which connects the piston with a belt engaging means corresponds substantially to the belt path when the safety belt is worn. Thereby, a rectilinear introduction of force into the traction transfer means is ensured, so that lateral forces scarcely act on it in the case of restraint or in normal travelling operation when the safety belt is worn.

The recess in the vehicle can be a downwardly extending trough which is open or closed or can be a port, the cylinder—in the case of a downwardly open recess—being able to project therefrom by its lower end.

Simple types of fastening of the belt tensioner to the vehicle floor are, for example, the provision of a fastening means projecting radially from the exterior of the cylinder shell which means is in turn arrested on the vehicle floor. The fastening means can be a radial flange or an external thread by which the cylinder can be screwed into a counter-thread in the recess in the vehicle floor or a nut fastened to the vehicle floor. With this type of fastening, no separate parts have to be supplied for the installation of the belt tensioner, which reduces the manufacturing and installation costs as a whole.

A further simple fastening possibility consists in the provision of a bayonet closure, a bayonet fitting being constructed on the vehicle floor, into which the cylinder is able to be introduced and turned by an outwardly projecting flange.

Further features and advantages of the invention will be apparent from the following description and the following drawings, to which reference is made. In the drawings.

Figure 1:
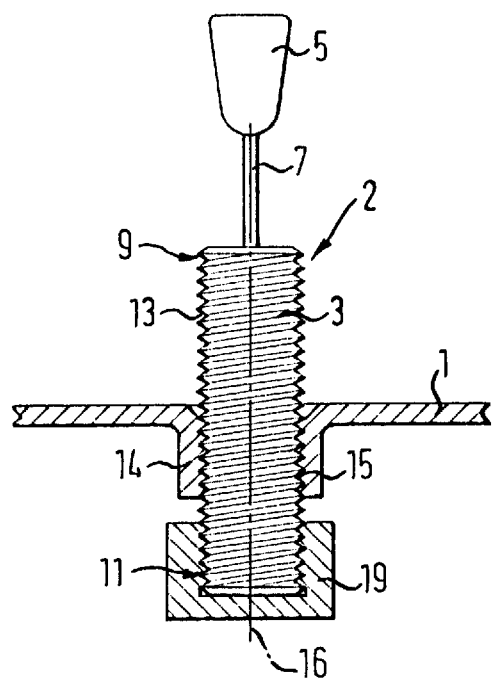
FIG. 1 shows a section through the region of the vehicle floor of the vehicle according to the invention, in which the belt tensioner is installed, according to a first embodiment, the belt tensioner being equipped with a protective cap at its lower end.

In FIG. 1 the region of the vehicle floor 1 is shown, in which a belt tensioner 2 in the form of a linear buckle tensioner is fastened. The tensioner 2 comprises a piston/cylinder unit, of which only the cylinder 3 is to be seen. A belt buckle 5 as belt engaging device is connected with the piston by a traction transfer means 7 in the form of a traction cable. The cylinder 3 has two axial ends, namely an upper end 9 facing the belt buckle 5 and a lower end 11 facing away therefrom. On the exterior of the cylinder shell a thread 13 is formed which belongs to a device for fastening the cylinder 3 to the vehicle floor 1. For the tensioner to project as little as possible into the interior of the vehicle, the vehicle floor 1 has a recess in the form of a downwardly open trough 14 with a counter-thread 15 as part of the device for fastening the cylinder 3, into which the cylinder 3 is screwed. As the thread 13 extends over the entire cylinder shell, the tensioner can be screwed to a greater or lesser depth into the vehicle floor 1. With this type of fastening of the tensioner in the vehicle, only a small installation space is necessary in the interior of the vehicle for accommodating the tensioner.

The cylinder 3 projects by its lower end 11 downwards from the trough 14 in the vehicle floor 1. A protective cap 19 which is twisted onto the end 11 prevents damage to the cylinder 3 by influences such as broken stones or corrosion.

As the end face of the cylinder 3 is open at the lower end 11, the protective cap 19 is torn away from the cylinder 3 during the tensioning process. The force necessary for tearing the protective cap 19 away is applied by the piston by it displacing gases inside the cylinder or by it striking against the protective cap 19 at the end of the tensioning path.

The central axis of the recess formed by the trough 14 is in alignment with the central axis 16 of the cylinder 3 and that of the traction transfer means 7. This central axis does not compulsorily have to be at right-angles to the surface of the vehicle floor 1 facing the interior of the vehicle, but rather it can be aligned obliquely thereto, and is coordinated with the course of the belt webbing in such a manner that as linear an introduction of force as possible is achieved from the belt via the belt buckle 5 into the traction transfer means 7. From the view of a vehicle occupant, the central axis 16 is preferably directed forward and upwards, so that the traction transfer means 7 is not stressed too greatly laterally when the safety belt is being worn.

Figure 2:
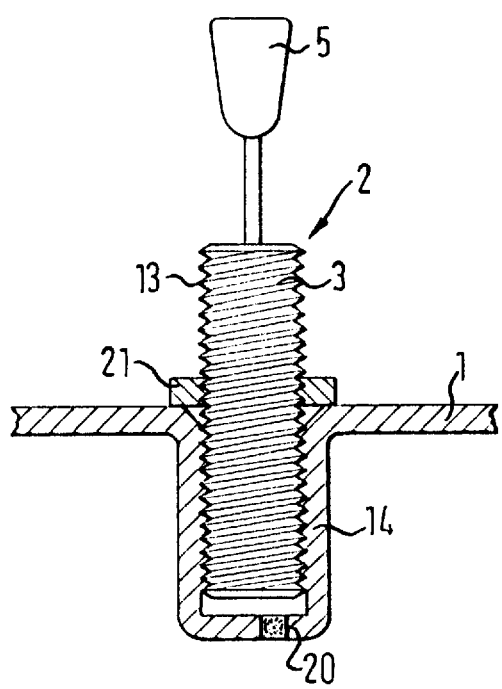
FIG. 2 shows a section, corresponding to FIG. 1, through the vehicle floor with installed belt tensioner, according to a second embodiment, the latter however not having a protective cap.

In the embodiment illustrated in FIG. 2, the trough 14 is closed so that the protective cap 19 is superfluous. The cylinder 3, which projects into the trough 14, is completely protected towards the exterior. A locking member 21 in the form of a counternut locks the belt tensioner 2 against rotation, holding it in its axial and radial position. A ventilation opening 20 on the base of the trough is closed by an elastic sealing material which owing to the gas pressure is removed when the belt tensioner is actuated and exposes the ventilation opening 20.

Figure 3:
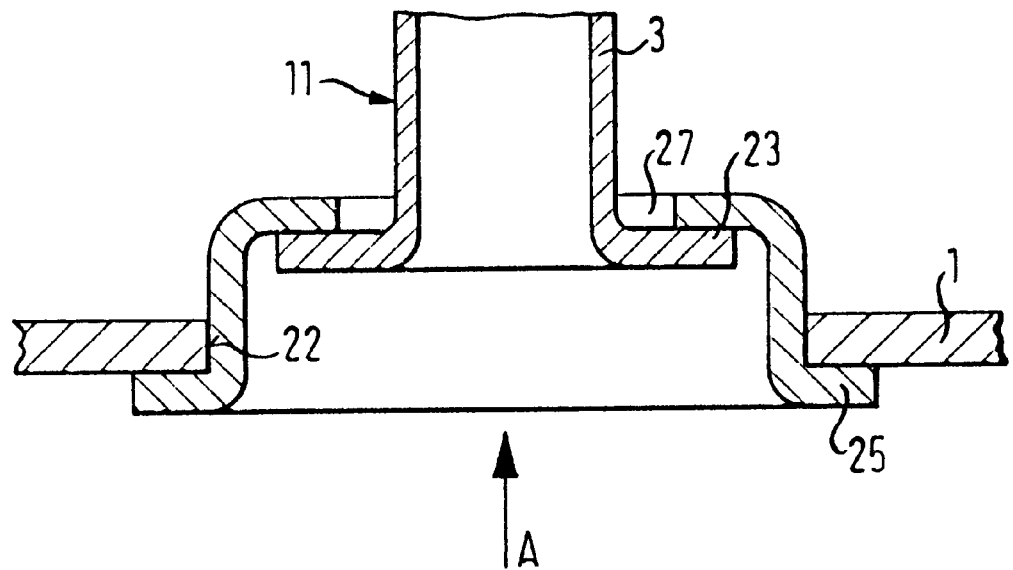
FIG. 3 shows the lower end of the belt tensioner connected with the vehicle floor by a bayonet closure, according to a third embodiment of the vehicle according to the invention.
Figure 4:
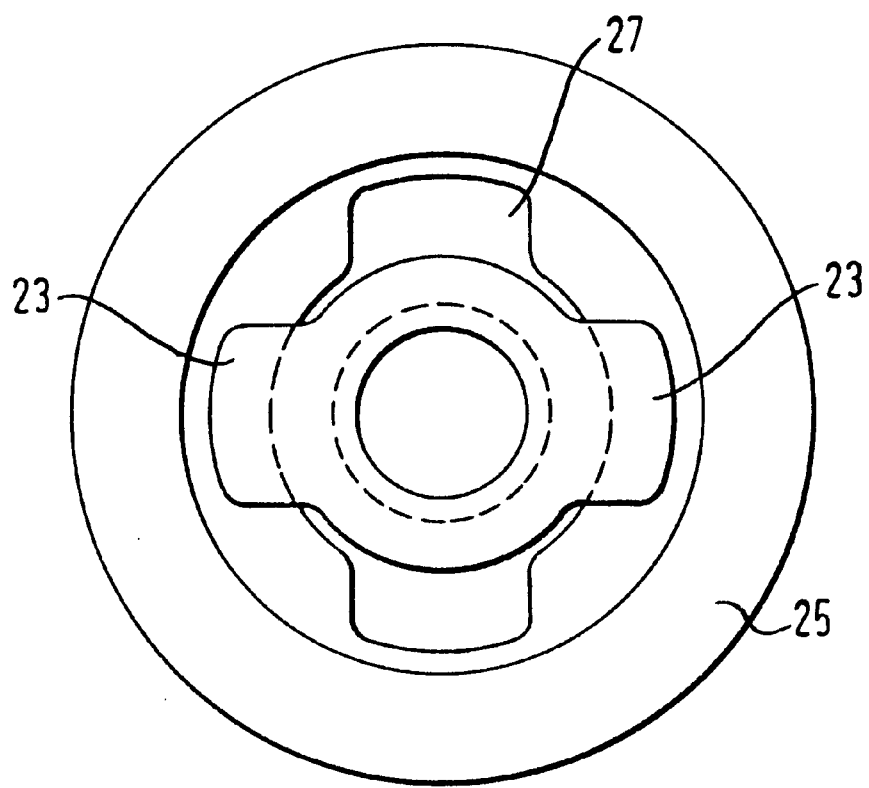
FIG. 4 shows a view in the direction of arrow A in FIG. 3.

In the embodiment of the belt tensioner 2 shown in FIG. 3, it has two opposing radially projecting flanges 23 at its lower end 11, which serve to fasten the belt tensioner in a port 22 in the vehicle floor 1. A cup-like part 25, belonging to the fastening device, is pressed into the port 22 and constitutes a bayonet fitting. The part 25 has a recess 27, the outer contour of which is adapted to that of the cylinder 3 together with the flanges 23, which permits an insertion of the cylinder 3 from the interior of the vehicle and, after turning the cylinder through 90°, prevents it from being drawn out. The device for fastening the cylinder 3 is therefore constructed as a bayonet closure which permits a quick arresting of the cylinder in the vehicle floor 1. The flanges 23 are formed by lateral bending of the cylinder shell. The part 25 can also be closed towards the bottom by a wall which serves simultaneously as a support for the flanges 23. In addition, for example a detent device can be provided, which serves as a lock against rotation, as is usual in bayonet closures.

Furthermore, the cup-like part 25 can also be introduced from above into the port 22, whereby the tensioner 2 is arranged deeper and projects less into the interior of the vehicle. In the embodiment illustrated in FIG. 3, the cylinder 3 is open downwards on the end face.

Figure 5:
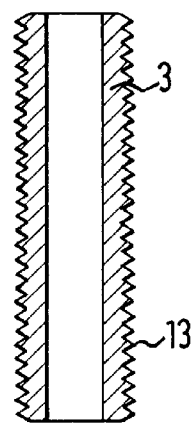
FIG. 5 shows a sectional view through the vehicle floor of the vehicle according to a third embodiment with a nut inserted in the recess.

Instead of providing a counter-thread 15 in the trough 14 and hence in the floor plate itself, in the embodiment according to FIG. 5 a nut 33 is inserted in the trough 14 and is welded with the floor plate 1.

Figure 6:
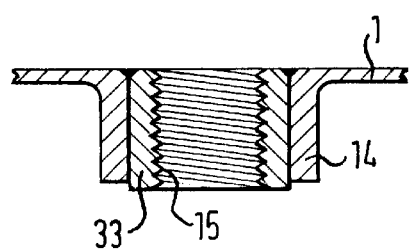
FIG. 6 shows a sectional view through the vehicle floor of the vehicle according to the invention, in accordance with a fourth embodiment, in which a sleeve with external thread is inserted as fastening means into the depression.

In the embodiment illustrated in FIG. 6, a sleeve with an external thread 15 is inserted in the trough 14 and is welded with the floor plate 1, and the cylinder 3 which is not shown has a downwardly open end face and also has an internal thread on the inner face, by which it is screwed onto the thread 15.

Figure 7:
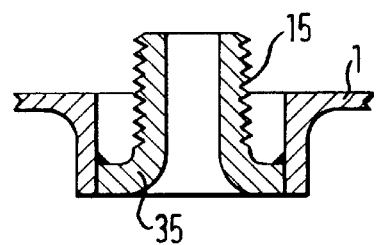
FIG. 7 shows a sectional view through the vehicle floor of the vehicle according to a fifth embodiment, a radially projecting fastening flange being provided on the exterior of the tube.

Further possibilities for fastening the tensioner to the vehicle floor 1 are shown in FIG. 7. According to the left-hand half of FIG. 7, an L-shaped flange 39, connected with the cylinder 3, is provided, which rests on the vehicle floor 1 and is screwed to it.

The device illustrated in the right-hand half of FIG. 7 for fastening the cylinder 3 to the vehicle floor 1 is formed by a ring flange, i.e. by a ring-shaped disc, which is welded to the cylinder 3. The cylinder 3 is screwed to the vehicle floor via the flange 41.

Figure 8:
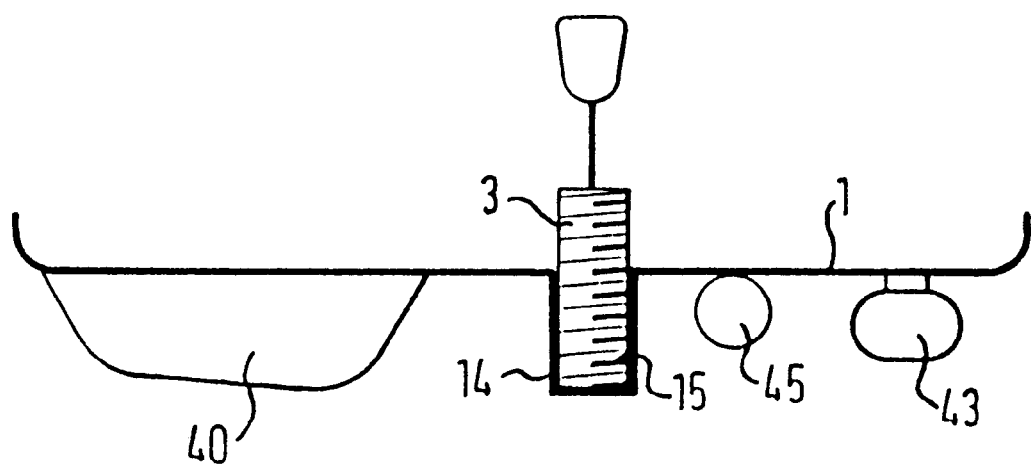
FIG. 8 shows a sectional view through a vehicle floor according to a further embodiment, with a belt tensioner fastened thereto, transversely to the direction of travel.

FIG. 8 illustrates at which point the recess for accommodating the belt tensioner is most favourably arranged. Vehicle floor sections, e.g for the vehicle tank 40 project downwards from the underside of the vehicle floor 1. In addition, vehicle parts such as the exhaust 43 and Cardan shaft 45 (if present) are provided, arranged beneath the vehicle floor. The recess for the belt tensioner should be provided between one or more of such protruding vehicle floor sections and vehicle parts. An advantageous position for the recess into which the belt tensioner projects is between the tank 40, the Cardan shaft 45 and the exhaust 43. Furthermore, the tank 40 can be arranged for example around the depression. This arrangement is intended to protect the trough or the belt tensioner projecting out from the vehicle floor from influences such as broken stones, corrosion or the like.

What is claimed is:

1. A vehicle, with a vehicle floor (1), with a belt tensioner (2) which comprises a piston/cylinder unit, and with a device for fastening the cylinder (3) to the vehicle floor (1), characterized in that the vehicle floor (1) has a recess into which the cylinder (3) at least partially projects.

2. The vehicle according to claim 1, characterized in that the recess is configured and the positions of the fastening device and the cylinder (3) are coordinated with each other such that the central axis (16) of a traction transfer means which connects the piston with a belt engaging device substantially corresponds to the course of the safety belt when it is worn.

3. The vehicle according to claim 1, characterized in that the recess is a downwardly extending trough (14) in the vehicle floor (1).

4. The vehicle according to claim 3, characterized in that the trough is closed towards the bottom.

5. The vehicle according to claim 4, characterized in that the trough has a ventilation opening (20).

6. The vehicle according to claim 1, characterized in that the recess is a port (22).

7. The vehicle according to claim 1, characterized in that the cylinder (3) has a lower end (11) which projects downwards out from the recess.

8. The vehicle according of claim 1, characterized in that the fastening device is constructed as a bayonet closure.

9. The vehicle according to claim 8, characterized in that a bayonet fitting is constructed in the vehicle floor (1) and at least one flange (23) projects radially outwards from the cylinder (3), which flange (23) forms the counter-piece to the bayonet fitting and is able to be introduced and twisted into it.

10. The vehicle according to claim 9, characterized in that the flange (23) is formed by lateral bending of a part of the cylinder shell at its lower end (11).

11. The vehicle according to claim 8, characterized in that the bayonet fitting is constructed in a cup-like part (25) fastened to the vehicle floor (1), which part (25) extends through the recess.

12. The vehicle according to claim 1, characterized by a locking member which prevents rotation of the belt tensioner (2) which is fastened to the vehicle floor (1).

13. The vehicle according to claim 1, characterized in that the belt tensioner (2) is a linear buckle tensioner.

14. The vehicle according to claim 1, characterized in that the recess is arranged between downwardly projecting vehicle floor sections (40) and/or vehicle parts (45, 43) provided beneath the vehicle floor.

15. A vehicle with a vehicle floor (1), with a belt tensioner (2) which comprises a piston/cylinder unit, and with a device for fastening the cylinder (3) to the vehicle floor (1), characterized in that the vehicle floor (1) has a recess into which the cylinder (3) at least partially projects, the recess is a downwardly extending trough (14) in the vehicle floor (1), the trough is closed towards the bottom, the trough has a ventilation opening (20), the ventilation opening (20) is sealed and is only exposed in the case of restraint.

16. A vehicle with a vehicle floor (1), with a belt tensioner (2) which comprises a piston/cylinder unit, and with a device for fastening the cylinder (3) to the vehicle floor (1), characterized in that the vehicle floor (1) has a recess into which the cylinder (3) at least partially projects, the cylinder (3) has a lower end (11) which projects downwards out from the recess, the lower end (11) projecting downwards from the recess being at least partially covered by a protective cap (19).

17. The vehicle according to claim 16 wherein the cylinder (3) is open at its lower end (11) on the end face and the piston, during the tensioning process, exerts a force onto the protective cap (19) which tears the protective cap (19) away from the cylinder (3).

18. A vehicle with a vehicle floor (1), with a belt tensioner (2) which comprises a piston/cylinder unit, and with a device for fastening the cylinder (3) to the vehicle floor (1), characterized in that the vehicle floor (1) has a recess into which the cylinder (3) at least partially projects, the fastening device is constructed as a bayonet closure, the cylinder (3) being open towards the bottom on the end face.

19. A vehicle, with a vehicle floor (1), with a belt tensioner (2) which comprises a piston/cylinder unit, and with a device for fastening the cylinder (3) to the vehicle floor (1), characterized in that the vehicle floor (1) has a recess into which the cylinder (3) at least partially projects, and wherein a radially projecting fastening means (13; 24; 39; 41) is provided as part of the fastening device on the exterior of the cylinder shall, which means (13; 24; 39; 41) is arrested on the vehicle floor (1).

20. The vehicle according to claim 19 wherein the fastening means is a radial flange (39; 41).

21. The vehicle according to claim 20 wherein the flange (39; 41) rests on the upper side of the vehicle floor (1) and is screwed to the vehicle floor (1).

22. The vehicle according to claim 20 wherein the fastening means is a thread (13) provided externally on the cylinder shell, which thread (13) is screwed into a part which is fixed to the vehicle floor.

23. The vehicle according to claim 22 wherein the recess has a counter-thread corresponding to the thread (13) into which counter-thread (15) of the cylinder can be screwed.

24. The vehicle according to claim 23 wherein the counter-thread is formed by a nut (33) which is fastened to the vehicle (1).

25. A vehicle, with a vehicle floor (1), with a belt tensioner (2) which comprises a piston/cylinder unit, and with a device for fastening the cylinder (3) to the vehicle floor (1), characterized in that the vehicle floor (1) has a recess into which the cylinder (3) at least partially projects, and wherein the cylinder (3) is open downwards on the end face and has a thread (15) on its cylinder shell on the inner face, by which thread (15) it is turned onto a screw-like extension (35) on the vehicle floor (1).

* * * * *